United States Patent [19]

Charruau

[11] Patent Number: 4,495,622
[45] Date of Patent: Jan. 22, 1985

[54] SYSTEM FOR SELECTING HIGH-RELIABILITY INTEGRATED CIRCUITS

[75] Inventor: Stéphane Charruau, Paris, France

[73] Assignee: Thomson-CSF, Paris, France

[21] Appl. No.: 377,844

[22] Filed: May 13, 1982

[30] Foreign Application Priority Data

May 15, 1981 [FR] France ................ 81 09757

[51] Int. Cl.³ ............................................. G01R 31/28
[52] U.S. Cl. ........................................ 371/20; 371/27; 324/73 R
[58] Field of Search ............................ 371/20, 21, 27; 324/73 R; 364/200 MS File

[56] References Cited

U.S. PATENT DOCUMENTS

| | | | |
|---|---|---|---|
| 3,789,205 | 1/1974 | James ................................ | 324/73 R |
| 3,969,618 | 7/1976 | Strubel et al. ..................... | 371/20 |
| 4,102,491 | 7/1978 | DeVito et al. ..................... | 371/20 |
| 4,115,847 | 9/1978 | Osder et al. ....................... | 371/20 |
| 4,195,769 | 4/1980 | Elias et al. ........................ | 324/73 R |
| 4,363,124 | 12/1982 | Aichelmann, Jr. ................ | 371/21 |
| 4,397,021 | 8/1983 | Lloyd et al. ....................... | 371/20 |
| 4,402,055 | 8/1983 | Lloyd et al. ....................... | 371/20 |

OTHER PUBLICATIONS

IBM-Technical Disclosure Bulletin; vol. 14, No. 10, Mar. 1972.
IBM-Technical Disclosure Bulletin; vol. 21, No. 8, Jan. 1979.
IBM-Technical Disclosure Bulletin; vol. 22, No. 3, Aug. 1979.

*Primary Examiner*—Jerry Smith
*Assistant Examiner*—M. Ungerman
*Attorney, Agent, or Firm*—Oblon, Fisher, Spivak, McClelland & Maier

[57] ABSTRACT

The selecting system makes use of a bank of amplifiers for successively and sequentially exciting P different types of integrated circuits assembled together in groups. The amplifying channels are periodically enabled one after the other by means of a demultiplexing circuit controlled from a processing and programming unit designated as PPU. The direct-current supplies comprise a programmable supply which is also addressed by the PPU and the output of which is applied to a switching matrix, the matrix being also addressed by the PPU and connected via P outputs respectively to the P groups of integrated circuits. Transmission of the excitation signals to the group of integrated circuits relating to said signals is performed by means of a second switching matrix addressed by the PPU. A mass memory unit such as a microprocessor is associated with the PPU and can have an electric functional test program for programming the excitation signals desired for selection.

11 Claims, 6 Drawing Figures

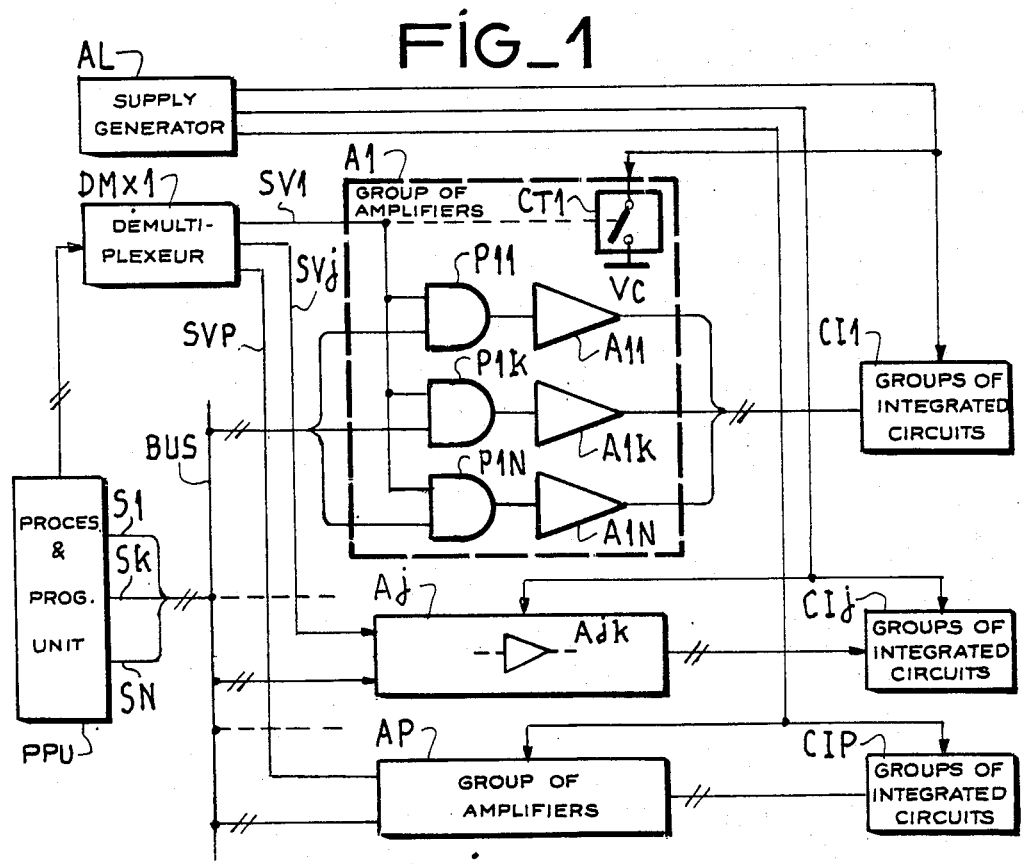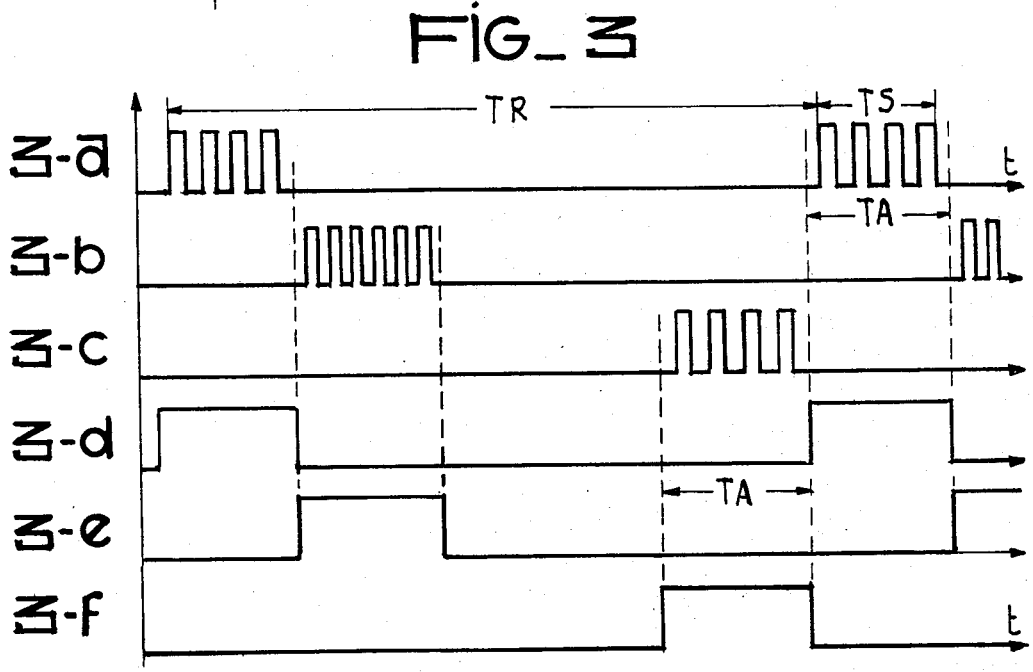

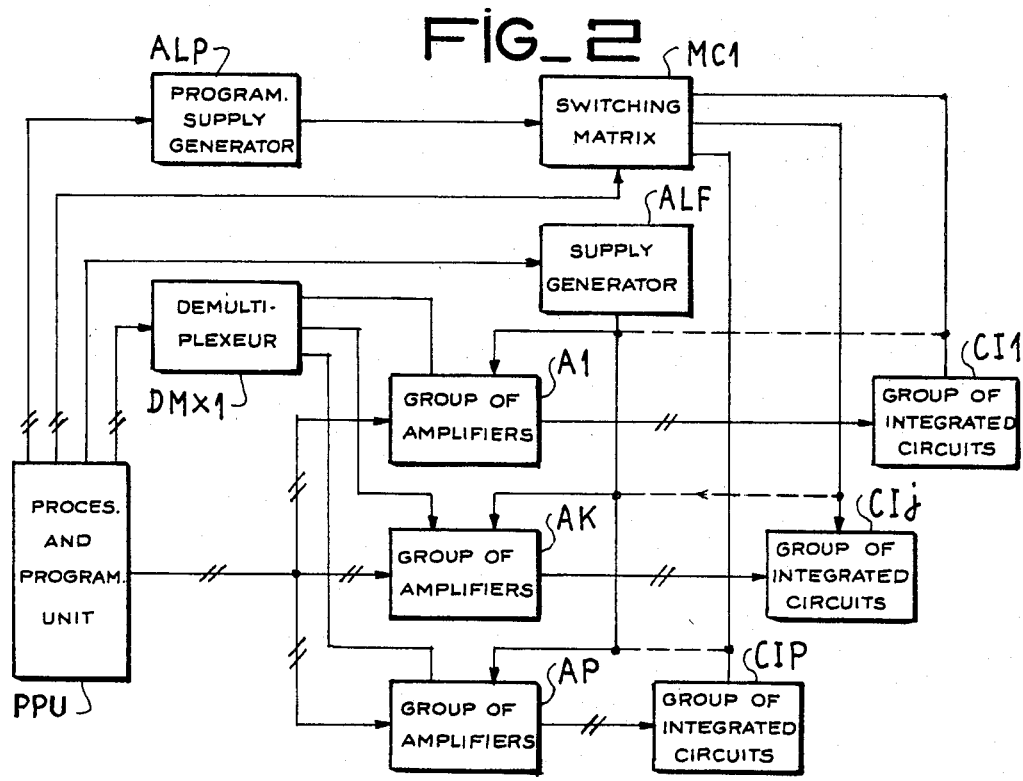
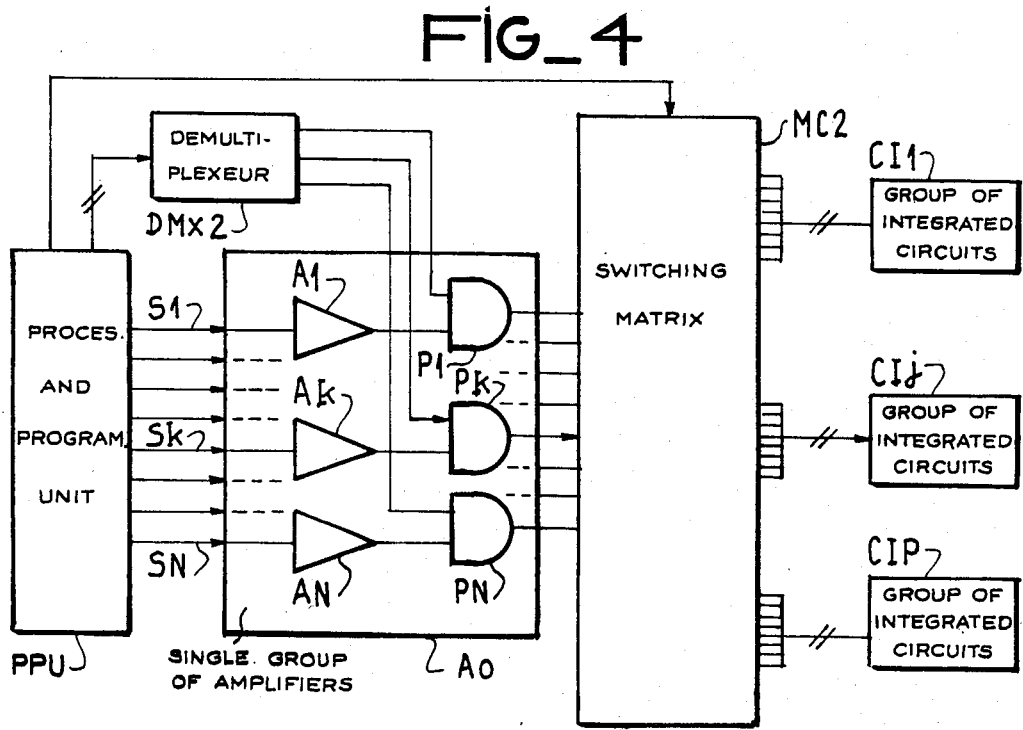

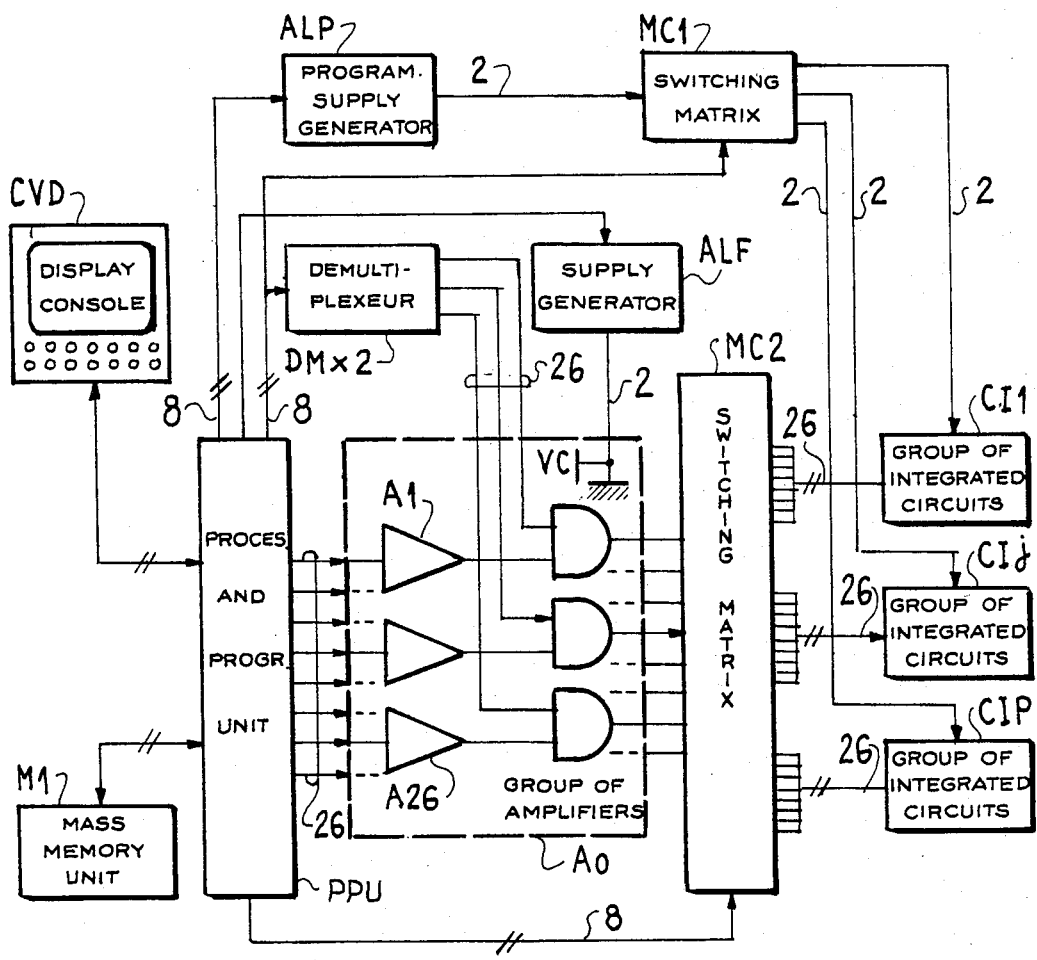

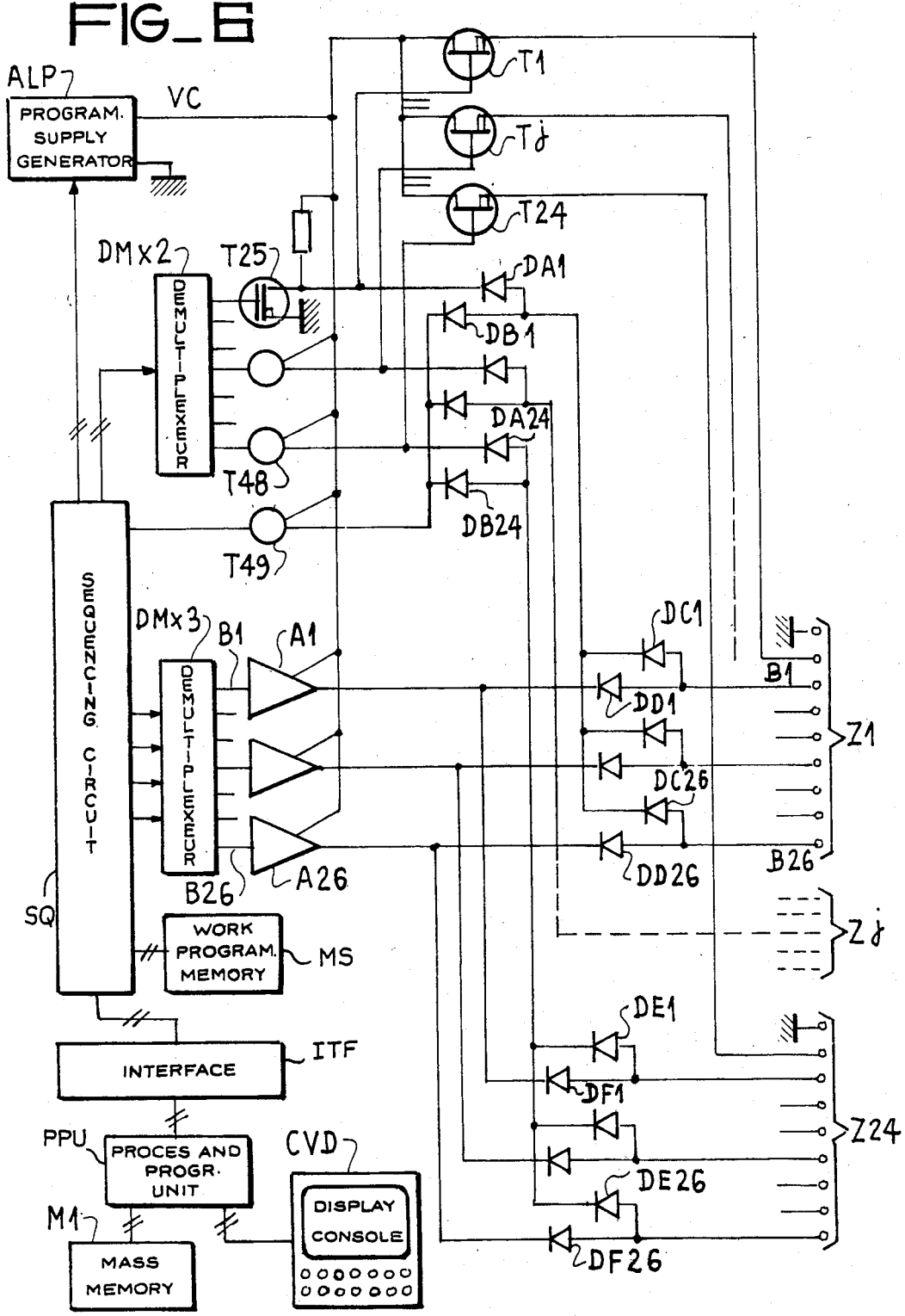
FIG_6

SYSTEM FOR SELECTING HIGH-RELIABILITY INTEGRATED CIRCUITS

BACKGROUND OF THE INVENTION

1. Field of the Invention

This invention relates to a system for the selection of integrated circuits which are characterized by high reliability.

A system of this type serves to select integrated circuits for ensuring high-reliability application and is based on the principle known as dynamic burn-in testing, in which a selection is effected as a function of severe thermal and dynamic stresses. The equipment induces accelerated aging of components and failure of those components which are not capable of withstanding the stresses applied during the test. The other components which conform to the desired standards will thus be selected for the fabrication of equipment units which exhibit a minimum failure rate and therefore a high degree of reliability.

2. Description of the Prior Art

A selecting system comprises a set of bidirectional power amplifiers for exciting separate groups of integrated circuits of different types placed within a heat treatment chamber. The invention relates in particular to means for controlling the power amplifier unit. Current designs for this purpose are based on hardware which utilizes wired logic as a function of the type of integrated circuit to be selected or, in more recent versions, a logic system for generating stimuli which are stored in a programmable memory (PROM). This makes it necessary to set up a specialized department for studies, in parallel with the department concerned with the production of high-reliability circuits. The role of this study department is to carry out an extensive analysis of logic diagrams and excitation chronograms with respect to each type of integrated circuit. The result deduced by the department takes the form either of instructions for assembly and short-circuit wiring (straps) to be formed on matrix boards or of a binary program to be loaded in a PROM memory. The matrix circuits or loaded PROM memories must then be stored and managed as the integrated circuit selection process takes place.

A scheme of this nature must remain fairly rigid since any modification of circuit specifications at the user's request, or any change in standard circuit specifications, or any creation of a new technological family of integrated circuits, necessarily entails a substantial workload which in turn produces a delay in the performance of the selection. Furthermore, it may be considered that the work of analysis mentioned earlier is duplicated to no purpose with the work already performed by the programming department on an automatic integrated circuit tester within the scope of acceptance tests on the user's premises.

A further drawback results from the heat which is released by the integrated circuits to be selected and which gives rise to a disturbance of thermal equilibrium within the oven, thus entailing the need for relatively complex regulating circuits.

SUMMARY OF THE INVENTION

The general aim of the invention is to overcome the aforementioned disadvantages by providing a device for selecting integrated circuits which involves pulsed excitation of the circuits with a form factor which can amount to a few units per cent, and multiplexing of different selection zones.

One object of the invention is to control the amplifiers according to a predetermined addressing mode so as to produce successively excitation sequences which are directed respectively towards the groups of integrated circuits concerned by these sequences. Multiplexing of the addresses of the different groups of integrated circuits enclosed within the heat treatment chamber is thus produced.

A further object of the invention is to produce sequentially and periodically the different supply voltages required by the groups of integrated circuits which are successively excited by the signals of the amplifiers. It is thus intended to reproduce at the level of the integrated circuits the effects of interruptions of the mains supply.

According to another object of the invention, the selection system makes use of hardware and logic means taken from automatic tester systems. One of these elements is the processing and programming unit of an automatic integrated-circuit tester which serves to generate digital signals for controlling the amplifiers. A second element is a display and dialog console for displaying the program of excitation of the circuits to be selected from the test program of said circuits. The assembly provides the user with the possibility of dialog management on the display console, of switching excitation sequences, or a panel showing the state of work occupation within the heat treatment chamber.

BRIEF DESCRIPTION OF THE DRAWINGS

These and other features of the invention will be more apparent upon consideration of the following description and accompanying drawings, wherein:

FIG. 1 is a diagram of a first embodiment of a system according to the invention for selecting integrated circuits;

FIG. 2 is a diagram of a second embodiment of the selecting system;

FIG. 3 is a diagram of waveforms relating to the operation of the system according to FIG. 2;

FIG. 4 is a partial diagram corresponding to a preferential embodiment of a selecting system according to the present invention;

FIG. 5 is a diagram of a selecting system according to FIG. 4;

FIG. 6 is a diagram showing one example of construction of a selecting system according to FIG. 5.

DETAILED DESCRIPTION OF THE PREFERRED EMBODIMENTS

In a system for selecting high-reliability integrated circuits, the integrated circuits are assembled together in separate groups and placed on trays within an oven. Consideration is given in FIG. 1 to P groups of integrated circuits CI1 to CIP. The circuits of any given group are considered as having the same number of terminal pins and/or capable of being excited by the same distribution of signals. It can therefore be considered that the system according to FIG. 1 is designed to produce P groups of excitation signals for exciting P types of integrated circuits. These excitation signals are produced by power amplifiers from digital signals applied to their inputs. The digital signals are produced by a processing and programming unit PPU. The arrangement shown in FIG. 1 reproduces a configuration of amplifiers in which these latter are distributed in P groups A1 to AP so as to produce the P separate groups of excitation signals, each group of amplifiers Aj being constituted by a bank of elementary amplifiers A11 to A1N, the total number N being a function of the number of dynamic signals comprised within a group. A maximum of seven signals may thus be contemplated in accordance with known techniques. However, it should be understood that this number is not limited to seven and could be greater or even equal to the total number of terminal pins of integrated circuits to be excited in a design of interconnection circuits between amplifiers and integrated circuits in which this interface configuration is made possible.

According to the invention, the groups of useful excitation signals are not transmitted simultaneously by the amplifiers A1 to AP but one after the other and in a periodic manner. With this objective, the digital signals delivered by the processing and programming unit are N in number and transmitted in parallel to the N amplifier groups A1 to AP by means of a bus line. The processing and programming unit therefore has only N outputs connected to the amplifiers by means of said line. In order to obtain a sequential distribution of the excitation signals, the selecting device further comprises a logical distributor circuit or demultiplexer DMX1 connected via P outputs respectively to the groups A1 to AP and addresses by the processing and programming unit PPU at its input. By way of example, addressing can be carried out by means of an 8-bit word. Depending on the address which is transmitted, only one of the groups A1 to AP is enabled by the corresponding output of the demultiplexing circuit DMX1 and only the corresponding amplifier group Aj will transmit a group of excitation signals to all the associated integrated circuits CIj. By way of example, enabling or inhibiting of the amplifiers is illustrated in detail in the group A1. This group can consist of AND-gates Pl1 to P1N interposed respectively in the upstream connection of the elementary amplifiers A11 to A1N. These two-input gates receive the corresponding enabling signal SVj via the second input.

In a practical construction, the demultiplexing function is performed by a circuit DMX1 in which are grouped together a microprocessor, peripheral matching interfaces and a random-access mass memory unit, with a view to taking the place of the PPU during continuous performance of burn-in testing of electronic components. During selection of integrated circuits, the high storage capacity processor thus takes over the production of sequences of stimuli which were preprogrammed by the PPU prior to the process of selection of the integrated circuits. The PPU which has thus been freed is accordingly permitted to carry out under optimum conditions the other functions which it has the allotted task of performing, that is, functions which relate to programming, safety of ovens, visual display, monitoring, control of digital-control machines associated with the selecting devices, and so on. The connection of the PPU to the microprocessor is effected via a standardized interface circuit.

The curves of FIGS. 3a to 3c show the operation which is both sequential and successive in time. Curve 3a represents a signal produced by one channel of the group A1, curve 3b relates to one signal of the following amplifier group A2, and curve 3c corresponds to a signal delivered by the last amplifier group AP. The time-duration TS corresponds to the enabling time, with the result that the complete cycle occupies a time interval which is at least equal to P×TS. The cycle can then be repeated at the period TR corresponding at least to this value. In the concept of FIG. 1, the supply voltages are delivered by circuits AL which provide the respective values +5 V, +12 V, +15 V, +5.2 V, −1.4 V, ... which are necessary for the different types of integrated circuits. For the sake of simplification, the elementary amplifier circuits and gate circuits included in each group Aj can be supplied with the same value of direct-current supply voltage as the value applied to the integrated circuits associated with said amplifier group. Furthermore, although this is not absolutely necessary, consideration may be given to the possibility of inserting a switching circuit CT1 in the supply channel of the circuits of the corresponding group A1, said switching circuit being controlled by the enabling signal SV1.

FIG. 2 illustrates an embodiment which is more advantageous than that of FIG. 1 and in which the principle of sequential distribution of the signals is also extended to the level of the supply signals. In this embodiment, the supply means are constituted by at least one programmable supply ALP which is addressed by eight wires from the processing and programming unit PPU and delivers via one output the direct-current voltage VC which corresponds to addressing. The supply output VC is transmitted to the group of integrated circuits CIj which is intended to receive this voltage at the moment considered by means of a distributor circuit or switching matrix MC1 corresponding to a power signal demultiplexing circuit. The circuit MC1 is also addressed by the PPU unit and comprises P outputs connected respectively to the P groups of integrated circuits CI1 to CIP. In fact, these connections are effected via the interface circuits constituted by the integrated-circuit support trays. As in the case of FIG. 1, the supply outputs can also be connected to the corresponding amplifier groups A1 to AP. One preferred solution consists in supplying the amplifiers at the output of a separate fixed supply ALF for delivering a supply voltage having a value which is higher than the maximum value delivered by the programmable supply ALP.

FIGS. 3d to 3f represent the respective supply signals of the groups of integrated circuits CI1, CI2 and CIP. The time-duration TA of the square wave which forms the supply signal is repeated periodically at the period TR. This time-duration TA is chosen so as to be slightly longer and overlaps the time interval TS during which the corresponding dynamic signals are generated.

FIG. 4 shows a preferred embodiment of a system according to the invention for selecting integrated circuits. The method adopted remains the same as in the case of either FIG. 1 or FIG. 2 but the structural arrangement is greatly simplified by the fact that only a single bank of N elementary amplifiers is employed. Distribution is carried out in this case on the output side of the amplifiers by means of a switching matrix MC2 in order to deliver the signals respectively and successively to the different groups of integrated circuits of different types. In this embodiment, the enabling control is also transferred to the downstream side of the N amplifiers A1 to AN by AND-gates which are supplied separately through their second inputs by the N respective outputs of a demultiplexing circuit DMX2 having N outputs. The channel AK which is enabled at a given instant is then connected to the corresponding group of integrated circuits CIj by means of the switching matrix or distributing circuit MC2 which is addressed by the processing and programming unit PPU. In a simple and economical design, the switching matrix MC2 can advantageously be obtained by means of diodes. It is apparent that this new version makes it possible to divide the number of amplifiers by P. In point of fact, the number P may attain 24 and a possible value of N is 28; it may thus be clearly perceived that this solution makes it possible to economize 23 times 28, namely 644 amplifiers. As can readily be understood, it is an advantage in this preferential embodiment to ensure that the supplies are also switched by adopting the circuit arrangement of FIG. 2.

A selecting system of this type is illustrated in FIG. 5 which also shows a mass memory unit M1 and a display console CVD which are associated with the processing and programming unit PPU.

The elements constituted by the processing unit PPU, the memory unit M1 and the display console CVD can form part of an automatic integrated-circuit tester which is available in catalogues. The mass memory unit M1 can consist basically of floppy disks whilst the processing and programming unit can be based on a microprocessor. The possibilities of the automatic tester may be extended even further by making use of software for functional test programming in order to constitute a program relating to the dynamic signals in the selecting device according to the invention.

FIG. 6 relates to an embodiment of a selecting system according to FIGS. 4 and 5. The elements of the processing and programming unit include the mass memory unit M1 of the floppy disk type or the like, a display and dialog console CVD, and a processing unit PPU of the type employed in an automatic integrated-circuit tester. In regard to the application contemplated in the selection of integrated circuits, the processing unit PPU is connected to the amplifiers and other circuits via matching means comprising through an IEEE interface circuit ITF a sequencing circuit SQ for acquisition and processing supply signals and dynamic signals referred-to as "stimuli". The bus line extending from the PPU unit to the sequencer SQ transfers data and addresses to and from the PPU unit. The sequencer SQ is associated with a work program memory MS, the design function of which is to define the instructions in their logical order of execution so as to enable the PPU unit to initiate operation of the amplifiers for burn-in testing of the integrated circuits which are in position within the ovens. The dynamic signals or stimuli are delivered to the amplifiers A1 to A26 via a demultiplexing circuit DMX3 and then supply twenty-six terminal pins of circuits of a given type. These integrated circuits are distributed in zones, consideration being given to twenty-four different types which are possible a priori and the zones are numbered from Z1 to Z24. It is apparent that a corresponding number of groups of stimuli will be produced at the outputs B1 to B26 of the processing and programming unit. A supply voltage VC and the reference ground potential will be assigned respectively to the two remaining terminals of the circuits, namely the terminals numbered 27 and 28. The sequencer SQ addresses the programmable supply ALP which delivers the direct-current voltage VC ; this voltage is transmitted through the switching matrix MC1 formed from MOS transistors or in other words field-effect transistors T1 to T24 in order to supply the terminal 27 of the respective zones Z1 to Z24. Availability of supplies is obtained by means of the circuit DMX2 consisting of an enabling decoder having twenty-four outputs also transmitted respectively through a field-effect transistor T25 to T48. Another transistor T49 is included in a general safety channel derived from the sequencer for ensuring supply and stimuli inhibition. The transistors T25 to T49 are supplied directly with the supply voltage VC. The amplifiers A1 to A26 have a very wide passband (100 MHz) and also comprise an output transistor of the same type as before. All the transistors are mounted as an analog switch. The remaining elements are constituted by an array of diodes which form the matrix MC2.

The operation takes place as follows : it will be postulated by way of example that the decoding circuit supplies the transistor T25 and that this latter turns-on the diode DA1 which in turn turns-on the bank of diodes DC1 to DC26, thereby permitting transmission of the signals of the corresponding zone Z1 via the diodes DD1 to DD26. A second direct-current supply can be provided for selecting more complex circuits which call for two different and separate supplies. The different zones Z1 to Z24 are essentially loaded with integrated circuits of the same type in which the terminal pins B1 to B26 plus the supply VC and the ground having the same number are wired in parallel on the support trays or elements, if necessary through daughter cards. The designations B1 to B26 are inherent to the system. An equivalence table coded in the system memory exists for the correspondence between the terminal pins of the system at the output of the processing unit (outputs of the circuit DMX3) and the terminal pins of the integrated circuits on the downstream side. Physical switching of stimuli by the central processor UTA therefore takes this written table into account at the moment of development of the test program of each integrated circuit. The particular features of this embodiment are related to multiplexing of the sequences of stimuli per zone, to switching of the stimuli by a diode matrix, to switching of supplies by a field-effect transistor matrix, and to the possibility of carrying out a locking function in the event of detection of a fault condition by the processing unit at the level of the heat treatment chambers.

The selecting system which is proposed thus offers many advantages. The time base or clock of the processing unit drives the demultiplexing circuit DMX1 or DMX2 and it may be considered that the output signal 1 drives the amplifying stages A1 to AN in succession in order to produce an enabling action on these latter. In state 0, the signal for enabling the amplifying channel is cut-off and behaves as a high impedance with respect to the corresponding integrated circuits which are connected to said channel. The frequency of the excitation signals transmitted during the time interval TS on each channel 1 to P may be considered as being very high in comparison with current practice and has a value of 1 MHz, for example, instead of 50 to 60 Hz. Furthermore, the fact that interruptions of supply are performed at a very high frequency in accordance with the concept of FIG. 2 or FIG. 5 permits very frequent reproduction of the states of turn-on, or interruption of supply, or turn-off, in the circuits to be selected. The result thereby achieved is an improved selection procedure which can be carried out during a shorter period of time, the results finally obtained being comparable if not superior to those achieved in conventional practice in which the dynamic signals and the supply signals were transmitted in a continuous manner. The so-called IEEE programmable supply can be carried out with a Rhode and Schwarz supply, type NGPU 70 V/20 A/350 W, which is capable of delivering seven distinct supply values. Should this number prove insufficient, provision can be made for other supplies or for another programmable supply in order to complete the supply values which are necessary for the selecting system.

What is claimed is:

1. A system for selecting high-reliabilit.y integrated circuits by thermal and dynamic treatment, comprising:

means for receiving the integrated circuits to be selected wherein said integrated circuits are constructed of P different types with respect to the number of terminal pins and wherein said integrated circuits are accordingly arranged in P separate groups on said means for receiving;

heat treatment means comprising a heat chamber in which said receiving means are disposed to provide a thermal treatment to said integrated circuits;

dynamic treatment means for generating dynamic signals to be applied to said integrated circuits, said dynamic signals consisting of P distributions of dynamic signals for exciting separately said P groups by signals conventional to the types of integrated circuits of each of said groups respectively, said P distributions being provided successively such that only one group of integrated circuits is excited at each instant considered, said P distributions being repeated periodically so that each of said groups receives sequentially its distribution of dynamic signals at the rate of said periodic repetition, said dynamic treatment means comprising a power amplifier assembly having first inputs for receiving digital control signals, second inputs for receiving enabling signals and outputs connected to said P groups of integrated circuits respectively for transmitting said P distributions and said dynamic treatment further comprising a programmable processing unit PPU for generating said control signals and a demultiplexing circuit for generating said enabling signals wherein said programmable processing unit has first outputs connected to said first inputs of said amplifier assembly and second outputs connected to said demultiplexing circuit to address said demultiplexing circuit by address signals, said control and address signals being determined to provide said P successive distributions at said outputs during the length of each of said periods;

direct current supplying means for producing a plurality of different d.c. supply of voltages for each of said P different types of integrated circuits, said voltages being transmitted periodically to each of said integrated circuits at the same rate as said dynamic signals in order to supply the type of integrated circuits excited at the instant considered with the voltage specified for said type and during a interval slightly longer and overlapping the time of application of the dynamic signal supplied to said type, and further wherein said supply means comprises a programmable supply which is addressed from the programming processing unit and having an output connected to a switching matrix also addressed from said programming processing unit and said supply further having outputs connected respectively to each of said integrated circuits of said different groups so as to distribute the corresponding voltages to each of said groups successively;

and further wherein said integrated circuits have at least one of said terminal pins for receiving said supply voltage and a plurality of other terminal pins for receiving said dynamic signals with the maximum number N of said other of said pins determining the minimum number of said first inputs of said power amplifier assembly according to the different types of integrated circuits wherein said assembly comprises at least one set of N power amplifiers.

2. A system according to claim 1 wherein said dynamic signals are formed of high-frequency pulses.

3. A system according to one of claim 1 or 2 wherein the programming of said programming processor unit provides excitation signals which comprise functional test signals employed during an automatic test procedure provided for said integrated circuits.

4. A system according to claim 1 wherein said amplifiers are constituted by P sets of N amplifiers in order to deliver for each set a maximum number of N excitation signals, wherein the said programming processing unit supplies the control signals to the amplifiers from N outputs connected respectively to the inputs of said P sets via a bus line in parallel.

5. A system according to one of claim 1 or claims 4 wherein said power amplifier assembly comprises for each amplifier an AND- gate connected via a first input to the processing unit in order to receive one of said control signals and which is connected via a second input to said demultiplexing circuit to receive one of said enabling signals and which is connected via its output to an associated amplifier.

6. A system according to claim 1 wherein the direct-current supply means further comprises a separate fixed supply circuit to supply directly said power amplifying assembly.

7. A system according to claim 1 wherein said N number of amplifiers is such that N is the maximum number of excitation signals in said distributions and wherein said processing unit supplies respectively the N amplifiers via N outputs and wherein addressing of the demultiplexing circuit provides sequential control of the operation of the amplifiers in order to produce in succession the P distributions of dynamic signals and furthermore wherein a second switching matrix is provided which is addressed by said programming processing unit for connecting said amplifying outputs to the group of integrated circuits to which said signals are to be applied.

8. A system according to claim 7 wherein said power amplifier assembly comprises N AND-gates connected via a first input to the output of a power amplifier and connected via a second input to the demultiplexing circuit to receive said enabling signal and connected via the output of said power amplifier assembly to the second switching matrix.

9. A system according to claim 7 wherein the supply distribution circuit is provided by means of field effect transistors and wherein said second switching matrix is a diode matrix.

10. A system according to any one of claims 1, 4, 7 wherein the processing unit is connected to the amplifiers by means of a high memory-capacity process for carrying out the generation of sequences of stimuli during burn-in testing of the integrated circuits wherein said stimuli is programmed by said processing unit prior to the process of burn-in testing of said integrated circuits.

11. A system according to claim 1 wherein the programming processing unit is associated with a mass memory unit and with a display and keyboard terminal and wherein the data stored in said memory unit is such that it comprises a functional electronic test program for the integrated circuits which are to be selected wherein the function of said program is to produce the digital signals for controlling said amplifiers.

* * * * *